(No Model.)
C. D. CARTER.
IMPLEMENT FOR TRANSPLANTING.
No. 542,584. Patented July 9, 1895.
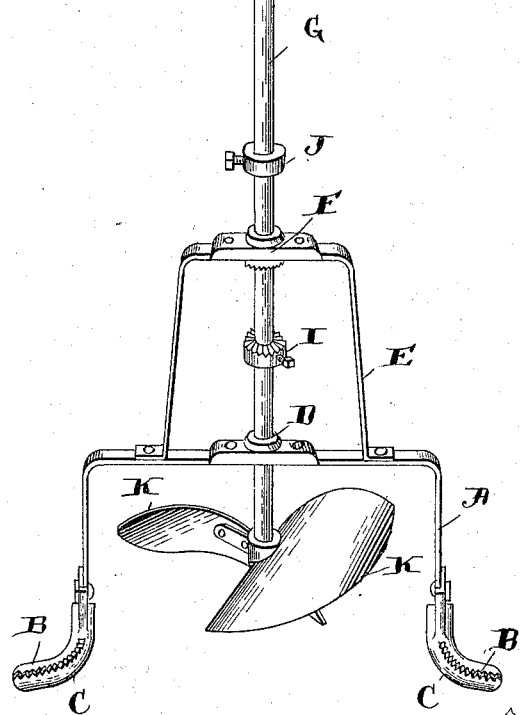

UNITED STATES PATENT OFFICE.

CHARLES D. CARTER, OF SPRING ARBOR, MICHIGAN.

IMPLEMENT FOR TRANSPLANTING.

SPECIFICATION forming part of Letters Patent No. 542,584, dated July 9, 1895.

Application filed December 13, 1894. Serial No. 531,682. (No model.)

*To all whom it may concern:*

Be it known that I, CHARLES D. CARTER, of Spring Arbor, in the county of Jackson and State of Michigan, have invented certain new and useful Improvements in Implements for Use in Setting Out Strawberry-Plants; and I do hereby declare the following to be a full, clear, and exact description of the invention, such as will enable others skilled in the art to which it pertains to make and use it, reference being had to the accompanying drawings, which form part of this specification.

My invention relates to an improved implement for use in setting out strawberry-plants; and the object of the same is to provide a device for forming depressions in the ground, having cone-shaped bottoms, upon which the strawberry-plant may be placed with the roots spread thereover in an easy and natural position for gaining a hold in the ground.

The invention consists in the novel features of construction hereinafter fully described and claimed, and illustrated in the accompanying drawings, in which—

Figure 1 is a perspective view of the implement. Fig. 2 is a view of the cone formed thereby. Fig. 3 is a similar view with the plant in position.

A designates an arched frame, having at its extremities the feet B, which rest upon the ground and which are formed with the lateral extensions C, upon which the operator places his feet after the implement has been properly positioned for the purpose of holding it in forming the cone. A bearing D is arranged centrally in said arched frame, and extending upward from the latter is the support E, having the bearing F arranged in line with bearing D, and extended vertically through said bearings is shaft G, having at its upper end the cross-handle H, for operating the implement. The under side of bearing F is toothed or serrated, while arranged on the shaft beneath said bearing is collar I, similarly serrated upon its upper side, so that when the shaft is drawn up the said serrated surfaces engage and prevent the shaft from turning, so that the implement may be conveniently positioned and its supporting frame turned to either one side or the other when it is held by handle H. A stop J is adjustable vertically on the shaft above said bearing D, for the purpose of regulating the depth at which the implement shall work.

Arranged upon the lower end of shaft G and within the arched frame A are the shares K, which are curved in longitudinal extent, as shown, as well as being curved outward and downward.

In operation the implement is placed over the hill and the shaft depressed, so as to force said shares into the ground, and then the same are rotated by means of the shaft, thus forming a cone-shaped mound, as illustrated in the drawings. Upon this cone-shaped mound is placed the strawberry-plant, with its root spread or diverging outward and downward in an easy and natural position for obtaining a good hold in the earth and insuring a healthy growth of the plant. The apex of the cone is about on a level with the surrounding ground, while the earth removed in forming the cone is thrown in a circular mound around the hill.

Having thus fully described my invention, what I claim as new, and desire to secure by Letters Patent, is—

1. In an implement of the class described, the combination of a suitable supporting frame, the revoluble shaft therein, and the oppositely inclined curved shares K secured at their adjacent edges to opposite sides of the lower end of said shaft, substantially as shown and described.

2. An implement for use in setting out strawberry plants comprising the frame having a bearing provided with a serrated lower surface, the revoluble shaft mounted in the frame, the collar thereon having a serrated upper surface, and the mound forming device carried by the shaft, substantially as shown and described.

3. An improved implement for use in setting out strawberry plants comprising the longitudinally and transversely curved shares arranged to cross each other at the center of rotation, substantially as shown and described.

In testimony whereof I affix my signature in presence of two witnesses.

CHARLES D. CARTER.

Witnesses:
JOSIAH B. FROST,
GEO. J. GENEBACH.